(12) United States Patent
Arruda et al.

(10) Patent No.: US 7,168,417 B2
(45) Date of Patent: Jan. 30, 2007

(54) LOW AIRFLOW LOSS HYDROCARBON TRAP

(75) Inventors: Anthony C. Arruda, Ann Arbor, MI (US); William A. Rohrer, Ann Arbor, MI (US); Jeffry M. Leffel, Wixom, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/101,840

(22) Filed: Apr. 8, 2005

(65) Prior Publication Data

US 2006/0225712 A1     Oct. 12, 2006

(51) Int. Cl.
*F02M 33/02* (2006.01)
*F02M 33/04* (2006.01)

(52) U.S. Cl. .................... 123/518; 123/184.57

(58) Field of Classification Search ............... 123/518, 123/184.57, 516, 519, 521, 198 E, 198 D
See application file for complete search history.

(56) References Cited

U.S. PATENT DOCUMENTS

| | | | |
|---|---|---|---|
| 2,038,071 A * | 4/1936 | Wilhelm | 96/118 |
| 3,020,977 A | 2/1962 | Huppke et al. | |
| 3,038,211 A | 6/1962 | Luedi | |
| 3,454,502 A * | 7/1969 | Matz et al. | 502/401 |
| 3,477,210 A | 11/1969 | Hervert | |
| 3,699,749 A | 10/1972 | Nowicki | |
| 3,747,303 A | 7/1973 | Jordan | |
| 4,259,096 A * | 3/1981 | Nakamura et al. | 96/138 |
| 4,289,513 A | 9/1981 | Brownhill et al. | |
| 4,363,644 A | 12/1982 | Sato et al. | |
| 4,418,662 A | 12/1983 | Engler et al. | |
| 4,758,460 A | 7/1988 | Spicer et al. | |
| 5,125,940 A | 6/1992 | Stanhope et al. | |
| 5,207,734 A | 5/1993 | Day et al. | |
| 5,275,636 A | 1/1994 | Dudley et al. | |
| 5,538,697 A | 7/1996 | Abe et al. | |
| 5,582,003 A | 12/1996 | Patil et al. | |
| 5,619,853 A | 4/1997 | Brown | |
| 5,657,626 A | 8/1997 | Brown et al. | |
| 5,765,369 A | 6/1998 | Tanaka et al. | |
| 5,771,684 A | 6/1998 | Hertl et al. | |
| 5,787,707 A | 8/1998 | Hertl et al. | |
| 5,797,973 A | 8/1998 | Dudrey et al. | |
| 5,850,734 A | 12/1998 | Ketcharn | |
| 5,914,294 A | 6/1999 | Park et al. | |
| 5,934,069 A | 8/1999 | Hertl et al. | |
| 5,941,068 A | 8/1999 | Brown et al. | |
| 6,171,373 B1 | 1/2001 | Park et al. | |
| 6,220,022 B1 | 4/2001 | Muller et al. | |
| 6,230,693 B1 | 5/2001 | Meiller et al. | |
| 6,284,705 B1 | 9/2001 | Park et al. | |
| 6,350,291 B1 | 2/2002 | Gieseke et al. | |
| 6,355,077 B1 | 3/2002 | Chittenden et al. | |

(Continued)

*Primary Examiner*—Mahmoud Gimie
(74) *Attorney, Agent, or Firm*—Brinks Hofer Gilson Lione

(57) ABSTRACT

In one aspect of the present invention, a hydrocarbon trapping device is provided, including a conduit and an adsorbing element positioned within the conduit. The conduit includes a wall having a wall thickness and the adsorbing element has an adsorbing element thickness that is generally equal to or less than the wall thickness. Furthermore, the adsorbing element defines a leading edge, a trailing edge, and a flow path extending between the leading and trailing edges in a direction substantially parallel to a longitudinal axis of the conduit.

20 Claims, 6 Drawing Sheets

U.S. PATENT DOCUMENTS

| | | |
|---|---|---|
| 6,422,006 B2 | 7/2002 | Ohmori et al. |
| 6,464,761 B1 | 10/2002 | Bugli |
| 6,540,815 B1 | 4/2003 | Hiltzik et al. |
| 6,573,212 B2 | 6/2003 | McCrae et al. |
| 6,630,007 B2 | 10/2003 | Hirano et al. |
| 6,692,551 B2 | 2/2004 | Wernholm et al. |
| 6,696,384 B2 | 2/2004 | McCrae et al. |
| 6,699,561 B2 | 3/2004 | Wolff |
| 6,723,148 B2 | 4/2004 | Stass |
| 6,752,846 B2 | 6/2004 | Rotter et al. |
| 6,758,885 B2 | 7/2004 | Leffel et al. |
| 6,905,536 B2 * | 6/2005 | Wright ........................ 96/134 |
| 2002/0100263 A1 | 8/2002 | Jaroszczyk et al. |
| 2002/0124733 A1 | 9/2002 | Iriyama et al. |
| 2003/0192512 A1 | 10/2003 | Luley et al. |
| 2004/0079344 A1* | 4/2004 | Gimby et al. ............... 123/519 |
| 2004/0099253 A1* | 5/2004 | Tschantz .................... 123/518 |
| 2004/0112219 A1 | 6/2004 | Leffel et al. |

* cited by examiner

LOW AIRFLOW LOSS HYDROCARBON TRAP

BACKGROUND

1. Field of Invention

The present invention relates generally to an air intake system and more particularly to a trap for adsorbing hydrocarbons in the air intake system.

2. Related Technology

Due to laws requiring the reduction in the levels of hydrocarbons that vehicles may emit into the atmosphere, it is necessary for automotive designers to include systems in vehicles to control such emissions, even when the vehicle is not operating. Hydrocarbons remaining from engine reactions can leak out of the engine through the engine's air intake system. It is therefore desirable to reduce the levels of hydrocarbons released in this manner.

When the engine is not operating, a low-velocity airflow containing hydrocarbons leaks out of the engine, through the air intake system, and into the atmosphere. When the engine is operating, a high-velocity airflow enters the air intake system from the atmosphere and flushes the hydrocarbons remaining in the air intake system into the engine, where they are combusted. Therefore, it is beneficial to retain hydrocarbons contained in low-velocity airflow until high-velocity airflow flushes the hydrocarbons into the engine.

One device for retaining hydrocarbons from the air released through the engine's intake is a filter-like device having a hydrocarbon trapping element. Typically, the hydrocarbon trapping device is formed of monolithic carbon and is disposed in the air intake system of a motor vehicle. Therefore, when the engine is operating and the high-velocity airflow is flowing towards the engine, the hydrocarbon trapping device is considered to be upstream from the engine. The hydrocarbon trapping device operates by adsorbing hydrocarbons from the low-velocity airflow and purging the hydrocarbons with the high-velocity airflow.

One problem arising with hydrocarbon trapping devices, however, is that the devices may act as an obstruction to the air flowing to the engine, thus causing a pressure drop in the airflow to the engine. Therefore, in order to substantially reduce or prevent a drop in air pressure across the hydrocarbon trapping device, it is advantageous to increase the amount of air that can flow through the device.

Another problem associated with hydrocarbon trapping devices is that the adsorbing element can become saturated with hydrocarbons; substantially reducing or ceasing adsorption of hydrocarbons. Therefore, in order to effectively trap hydrocarbons and to substantially prevent saturation of the device, it is advantageous to increase the adsorption capacity of the hydrocarbon trapping device.

Yet another problem associated with hydrocarbon trapping devices is providing the devices with enough strength to sustain the structural integrity during operation of the vehicle.

Therefore, it is highly desirable to have a hydrocarbon trapping device that substantially prevents large airflow pressure drops across the device, that is able to adsorb a relatively large amount of hydrocarbons without becoming saturated, and that maintains a sufficient structural strength throughout the life of the device.

SUMMARY

In achieving one or more of the above objects, the present invention provides a hydrocarbon trapping device that includes a conduit and an adsorbing element positioned within the conduit. The conduit is in fluid connection with the air intake system to deliver air to the vehicle's engine. The conduit may be positioned within and connected to an air duct leading from the atmosphere to the engine, or it may be a unitary part of the air duct.

In one aspect of the present invention, The adsorbing element includes an arcuate sheet extending substantially completely around the inner perimeter of the conduit and has a thickness generally equal to or less than the wall thickness of the conduit. Additionally, one or more planar sheets of the adsorbing material may b longitudinally oriented in the conduit and extend across the width of the conduit to define two or more respective flow paths. Alternatively, the adsorbing element may be provided in a spiraled shape around the longitudinal axis of the conduit.

Preferably, the adsorbing material is composed of a paper sheet containing an integral adsorbing particles, such as carbon. Alternatively, the adsorbing material may be composed of a foam material impregnated with adsorbing particles. In yet another alternative design, the adsorbing element is composed of carbon pellets located between and supported by a pair of semi-permeable membranes.

Further objects, features and advantages of this invention will become readily apparent to persons skilled in the art after a review of the following description, with reference to the drawings and claims that are appended to and form a part of this specification.

DETAILED DESCRIPTION

Figure 1:
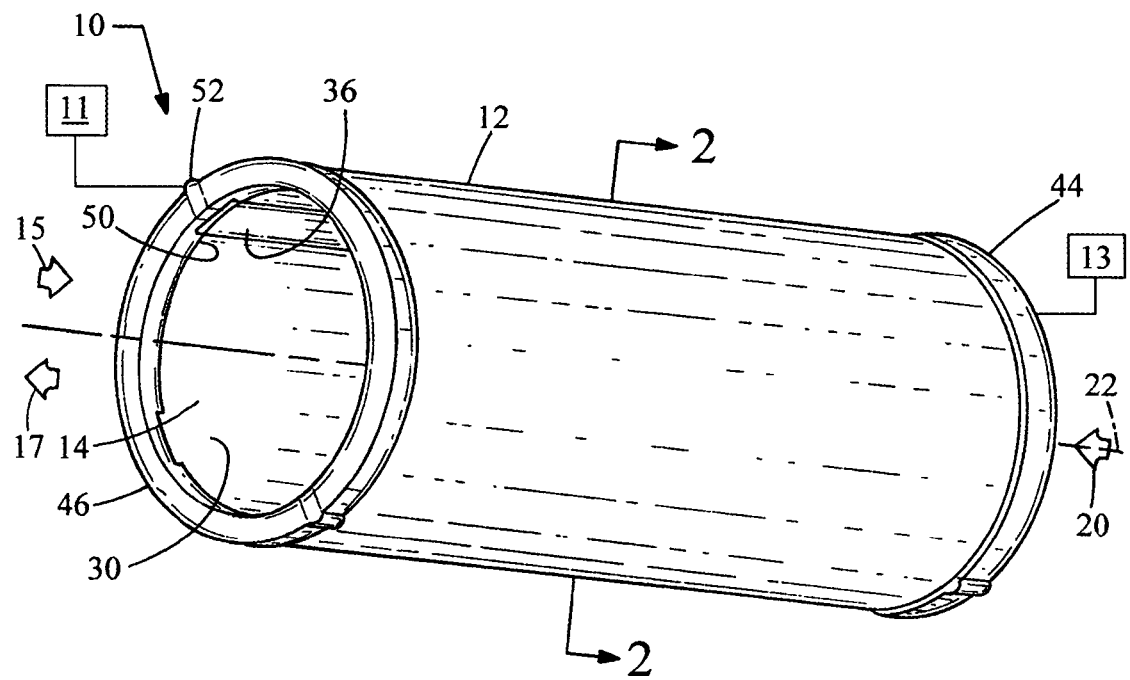
FIG. 1 is a perspective view of a hydrocarbon trapping device for an air intake system embodying the principles of the present invention.
Figure 2:
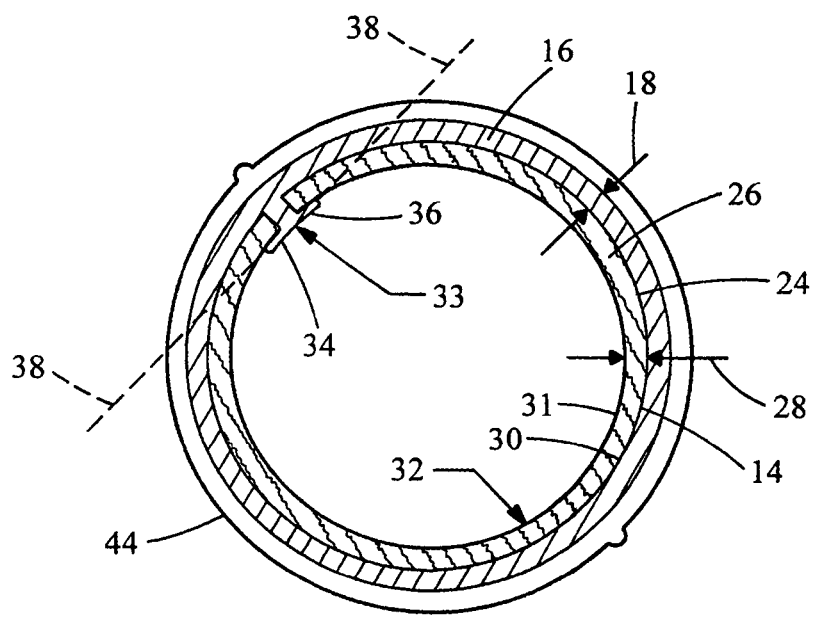
FIG. 2 is a cross-sectional view, generally taken along line 2—2, of the hydrocarbon trapping device in FIG. 1.

Referring now to the drawings, FIGS. 1 and 2 show a hydrocarbon trapping device 10 for an air intake system supplying air to a motor vehicle engine 11. The hydrocarbon trapping device 10 includes a conduit 12 and an adsorbing element 14 positioned within the conduit 12 for removing hydrocarbons from the air flowing through the air intake system.

When the engine 11 is not operating, a low-velocity, venting airflow containing hydrocarbons leaks from the engine 11 in a venting direction 15 towards the atmosphere 13. During this venting airflow, the adsorbing element 14 traps the hydrocarbons in this airflow, thus reducing pollution entering the atmosphere 13. During engine operation, a high-velocity, fresh airflow flows through the air intake system in a purging direction 17. This airflow purges and flushes the trapped hydrocarbons from the adsorbing element 14 to the engine 11, where the hydrocarbons undergo combustion.

The conduit 12 defines a cylindrical wall having a relatively thin wall thickness 18, such as 1–5 millimeters. The conduit 12 is preferably constructed of plastic, but any appropriate alternative material may be used. The conduit 12 shown in FIGS. 1–8 is a self-contained structure that is inserted within an air duct of the air intake system. More specifically, the conduit 12 is press-fit into the air duct to form a substantially air-tight seal with the air duct, thus forcing air flowing through the air intake system to pass through the conduit 12 along a fluid flow path 20, generally along a longitudinal axis 22 of the conduit 12. As will be discussed in greater detail below, the conduit 12 may have any appropriate alternative design.

The adsorbing element 14 is provided within the conduit 12 and includes a hydrocarbon adsorbing material 24, such as a paper sheet impregnated with carbon particles 26. The adsorbing element 14 has a thickness 28 substantially equal to or less than the conduit's wall thickness 18. More specifically, the adsorbing element's thickness 28 is preferably equal to 1–5 millimeters, causing the fluid flow path 20 to be substantially unconstricted by the presence of the adsorbing element 14 with the conduit 12.

The fluid flow path 20 is preferably 90% unobstructed, more preferably it is 95% unobstructed, and even more preferably 98% unobstructed by the trapping device 10 being positioned within the air duct of the air induction system. As used herein, the percentage of unobstruction is determined by measuring the cross-sectional area defined by the air duct to determine the total area. Next the cross-sectional area of the device 10 is subtracted from the total area to determine the unobstructed area. Finally, the unobstructed area is divided by the total area to determine the percentage of unobstruction.

The adsorbing element 14 is provided in sheet form and is wrapped substantially completely around an inner perimeter 30 of the conduit 12 such as to define a generally circular cross-section 32. The adsorbing element 14 is retained in a flush engagement with the inner perimeter 30 of the conduit 12 by a securing portion 33 having a pair of tabs 34, 36 extending in a direction 38 corresponding with the conduit wall 16. More specifically, the tabs 34, 36 and the inner perimeter 30 of the conduit 12 define a receiving space and cooperate to retain the arcuate sheet 31 in a press-fit engagement.

The adsorbing element 14 includes a leading edge 40 and a trailing edge 42, defined as such based on the purging direction 17. The leading and trailing edges 40, 42 are protected from premature wear by a pair of end caps 44, 46 that substantially cover the respective edges 40, 42. The end caps 44, 46 include channels 48 that snap over the conduit edges and the edges 40, 42 of the adsorbing element 14 to form a press-fit engagement with both the conduit 12 and the adsorbing element 14. Alternatively, the end caps 44, 46 are plastic welded or spin welded onto the conduit 12 and adsorbing element 14. The inner surface of the end caps 44, 46 includes notches 50 that are aligned with and configured to receive the securing portion 33. Furthermore, the outer surface of the end caps 44, 46 may include locator tabs 52 to properly align the notches 50 with the securing portion 33 during assembly of the trapping device 10.

Figure 3:
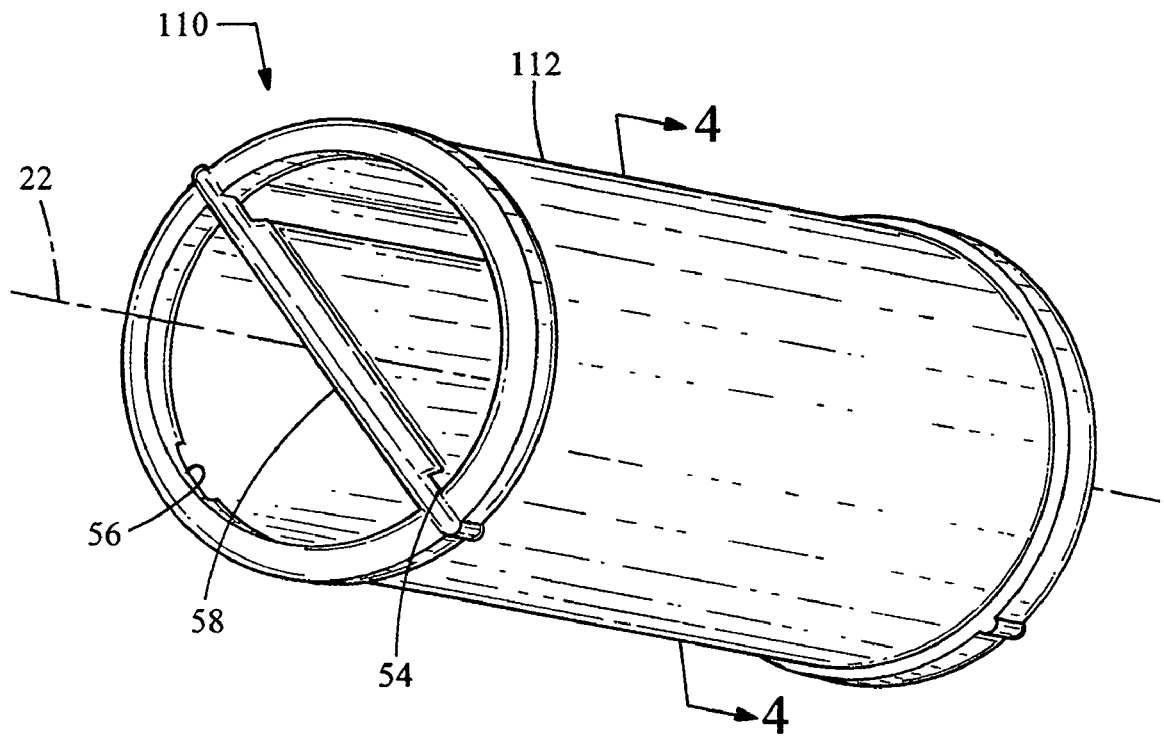
FIG. 3 is an alternative embodiment of the hydrocarbon trapping device shown in FIG. 1, including a planar sheet of an adsorbing element extending across the passageway of the device.
Figure 4:
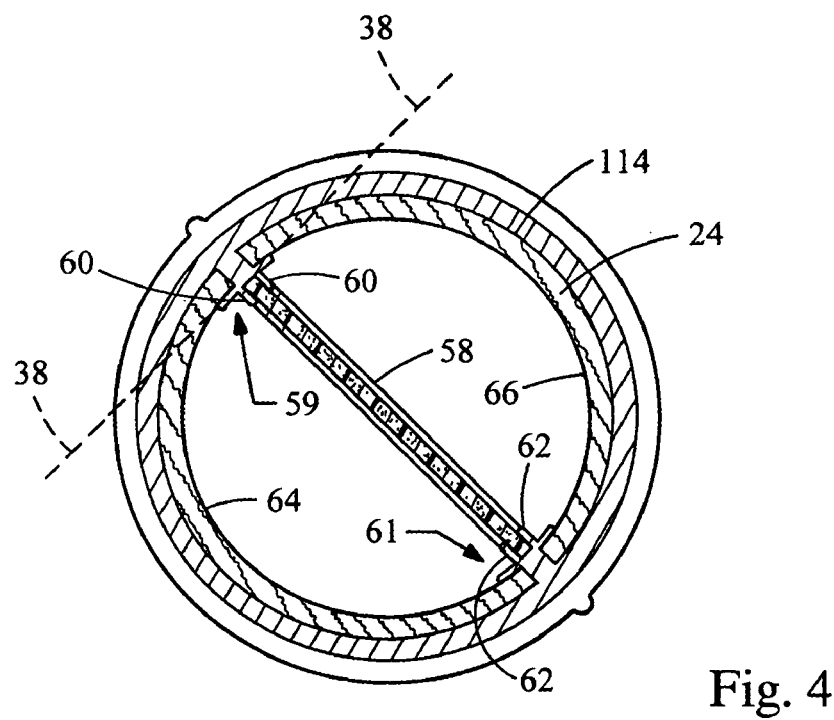
FIG. 4 is a cross-sectional view, generally taken along line 4—4, of the hydrocarbon trapping device in FIG. 3.

Referring now to FIGS. 3 and 4, an alternative embodiment of the present invention is shown. In this embodiment, the trapping device 110 includes a conduit 112 within which the adsorbing element 114 is located. The adsorbing element 114 includes a pair of arcuate sheets 64, 66 (separated by the securing portions 59, 61) that cooperate to wrap substantially around the inner surface 63 of the conduit 112. The arcuate sheets 64, 66 are secured to the conduit 112 by two pairs of tabs 68, 70 extending from the securing portions 59, 61 in the direction 38 generally corresponding to the inner surface 63.

The adsorbing element 114 further includes a planar sheet 54 of adsorbing material extending across the conduit 112. More specifically, the planar sheet 54 extends along the length of the conduit 112, in a direction parallel to the longitudinal axis 22, and spans across an opening 56 of the conduit 112. The leading and trailing edges of the planar sheet 54 are protected by planar end caps 58 that receive the respective edges in a manner similar to than described above with respect to the end caps 44, 46 shown in FIGS. 1 and 2. To secure the planar sheet 54, the conduit 112 includes securing portions 59, 61 each having a pair of tabs 60, 62 that together pinch receive the longitudinal edge of sheet 54. As such, the pairs of tabs 60, 62 each extend in a direction substantially parallel to the planar sheet 54 and substantially perpendicularly to the longitudinal axis 22.

Figure 5:
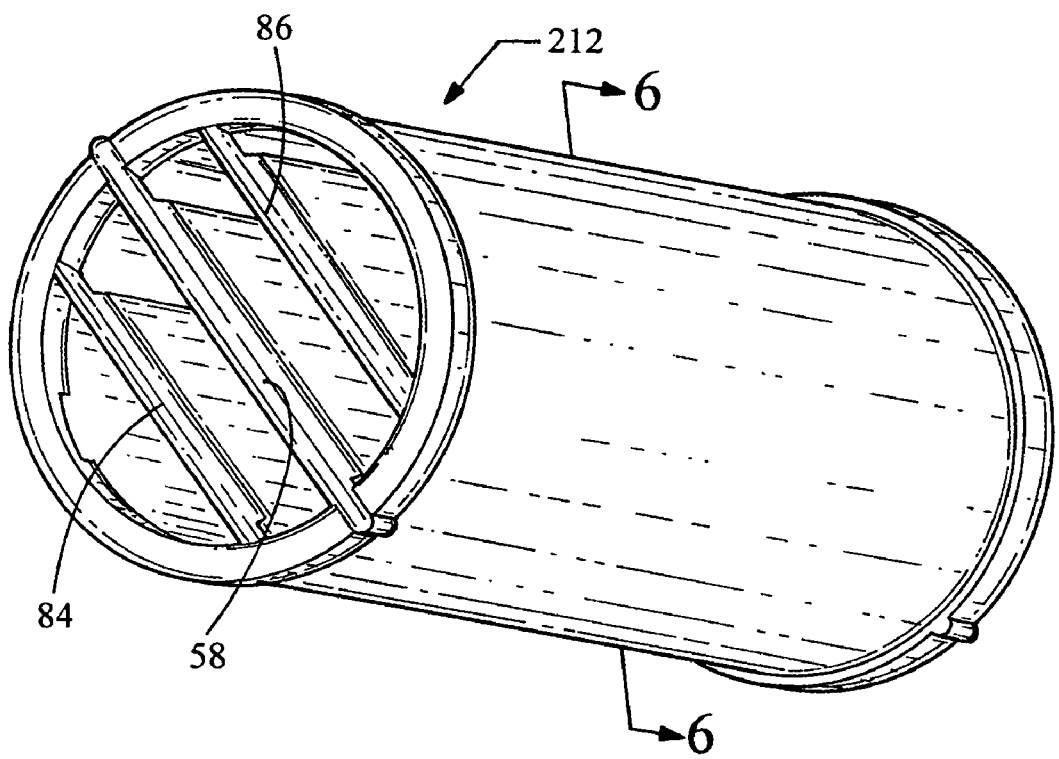
FIG. 5 is yet another alternative embodiment of the hydrocarbon trapping device shown in FIG. 1, including a plurality of planar sheets extending across the passageway defined by the device.
Figure 6:
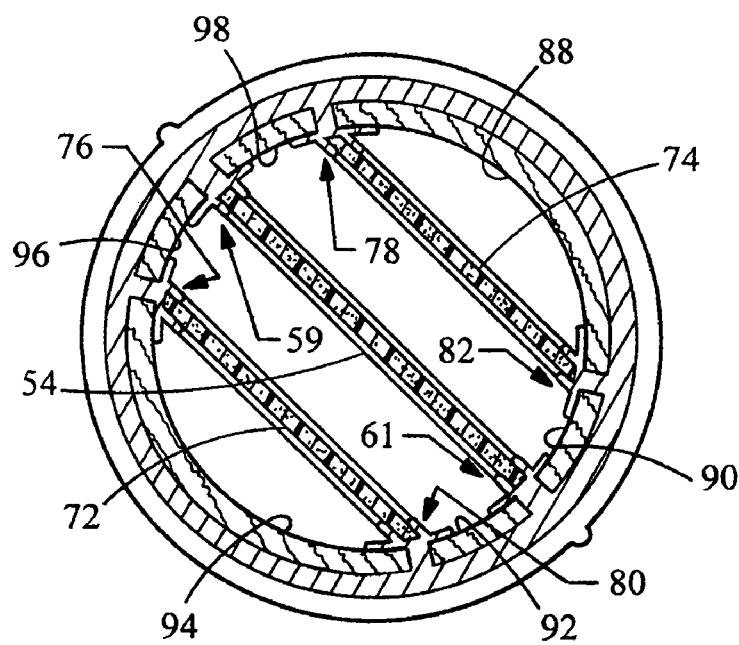
FIG. 6 is a cross-sectional view, generally taken along line 6—6, of the hydrocarbon trapping device in FIG. 5.

Referring now to FIGS. 5 and 6, another alternative embodiment of the present invention is shown. In this embodiment, in addition to the sheet 54 of the embodiment seen in FIGS. 3 and 4, the adsorbing element 214 includes to additional planar sheets 72, 74 of adsorbing material 24 (parallel to sheet 54) extending across the conduit 212 and secured by additional securing portions 76, 78, 80, and 82. Like sheet 54, the planar sheets 72, 74 extend along the length of the conduit 212 and across an opening 56 of the conduit 212. The leading and trailing edges of the planar sheets 72, 74 are protected by end caps 84, 86 that receive the respective edges in a manner similar to than described above with respect to the end caps 44, 46, 58 shown in FIGS. 1–4.

The trapping device 210 also includes six arcuate sheets 88, 90, 92, 94, 96, and 98 that are separated by the respective securing portions 59, 61, 76, 78, 80, and 82 and that cooperate to wrap substantially around the inner surface of the conduit 212. The arcuate sheets 88, 90, 92, 94, 96, and 98 are secured to the conduit 212 by tabs extending from the securing portions 59, 61, 76, 78, 80, and 82 in a manner similar to that described above.

Figure 7:
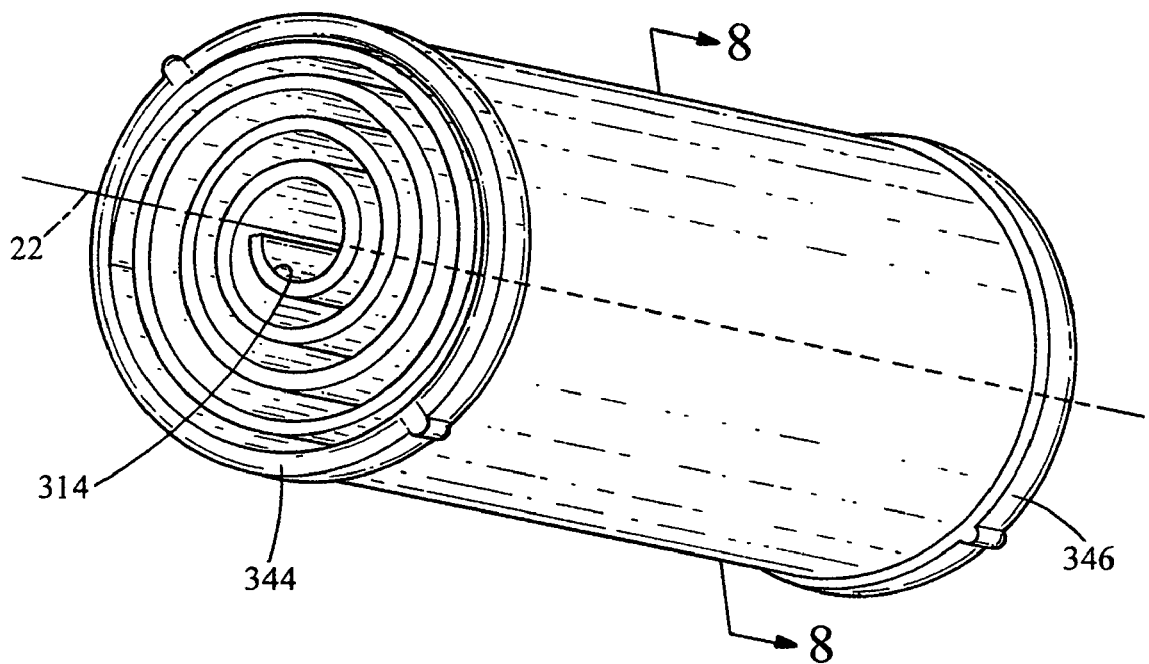
FIG. 7 is another alternative embodiment of a hydrocarbon trapping device embodying the principles of the present invention.
Figure 8:
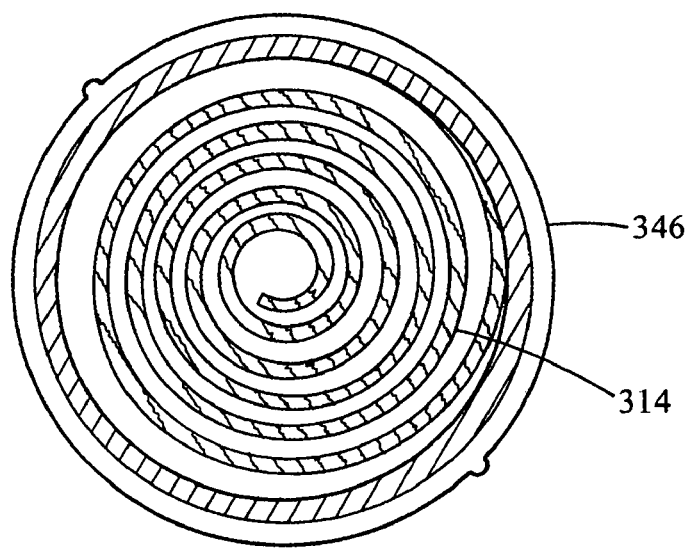
FIG. 8 is a cross-sectional view, generally taken along line 8—8, of the hydrocarbon trapping device in FIG. 7.

Referring now to FIGS. 7 and 8, yet another alternative embodiment of the present invention is shown. In this embodiment, the adsorbing element 314 has a generally spiral configuration and is oriented along and about the longitudinal axis 22. The adsorbing element 314 is protected by a pair of end caps 344, 346, similar to those described above, that also have a generally spiral configuration to protect the entire leading and trailing edges of the adsorbing element 314.

Figure 9:
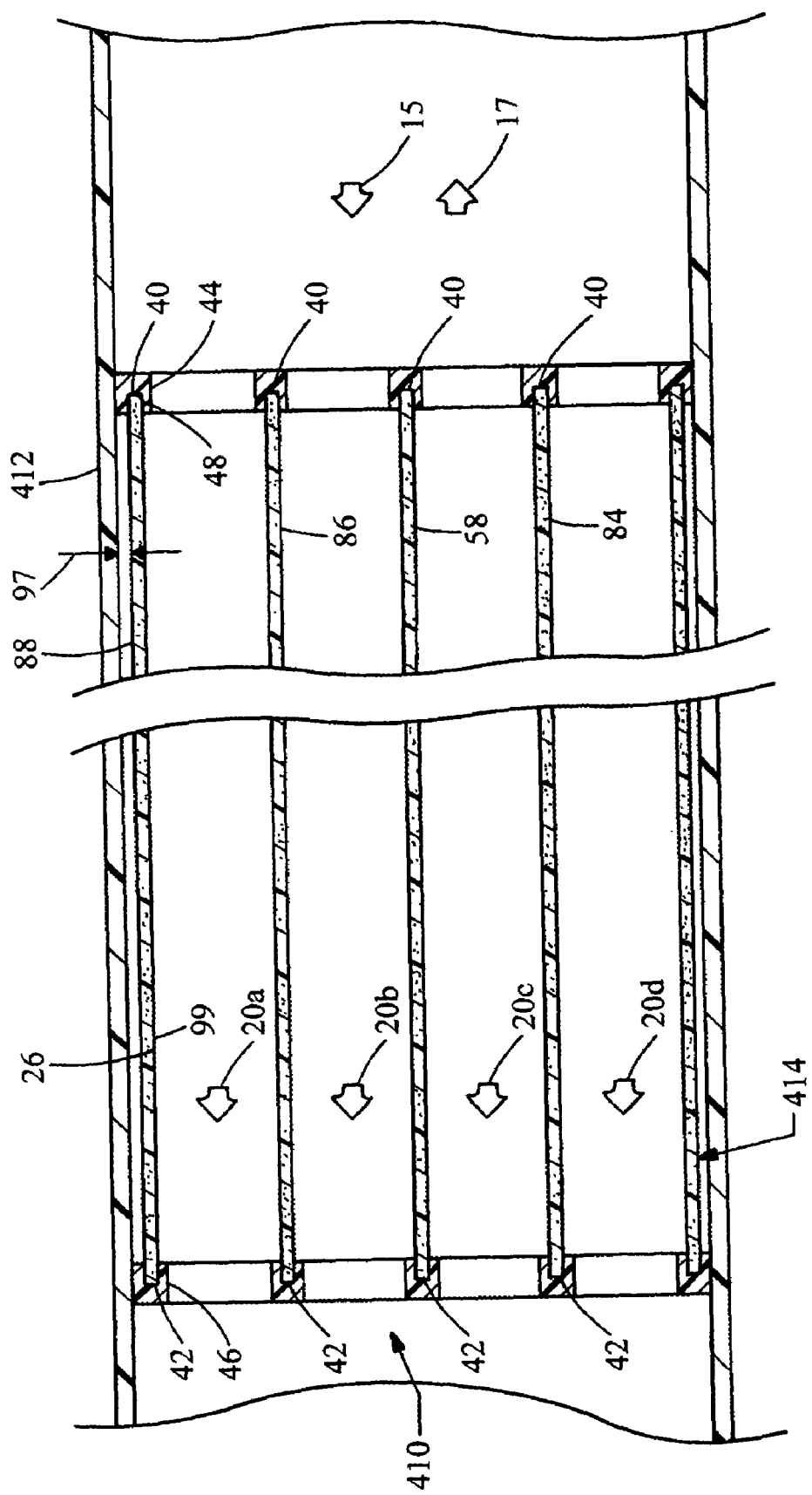
FIG. 9 is a longitudinal sectional view of a portion of an air intake system with a hydrocarbon trapping device embodying the principles of the present invention provided therein.

Referring now to the embodiment shown in FIG. 9, the trapping device 410 includes an adsorbing element 414 received within a duct 412 that is a unitary, one-piece portion of the air intake system air duct. In this embodiment the adsorbing element 414 is shown inserted directly into the air intake system in a press-fit manner. More specifically, the first and second end caps 44, 46 support the adsorbing element 414 and are each press-fit within the duct 412.

Similar to the previous embodiments, the adsorbing element 414 includes a plurality of arcuate sheets 88, 90, 92, 94, 96, and 98 and three planar sheets 58, 84, 86 received by the end caps 44, 46. The arcuate sheets 88, 90, 92, 94, 96, and 98 may be located a distance 97 from the duct 412 due to the thickness of the protective caps 44, 46. The adsorbing element 414 in this embodiment is composed of foam sheets 99 impregnated with carbon particles 26. Constructed in this manner, the planar sheets 58, 84, 86 of the adsorbing element 414' define four fluid flow paths 20a, 20b, 20c, and 20d that are substantially parallel with each other. Therefore, the flow paths 20a–d are each respectively contained within the respective portions of the trapping device, and the flow loss across the trapping device 10 is minimized.

Figure 10:
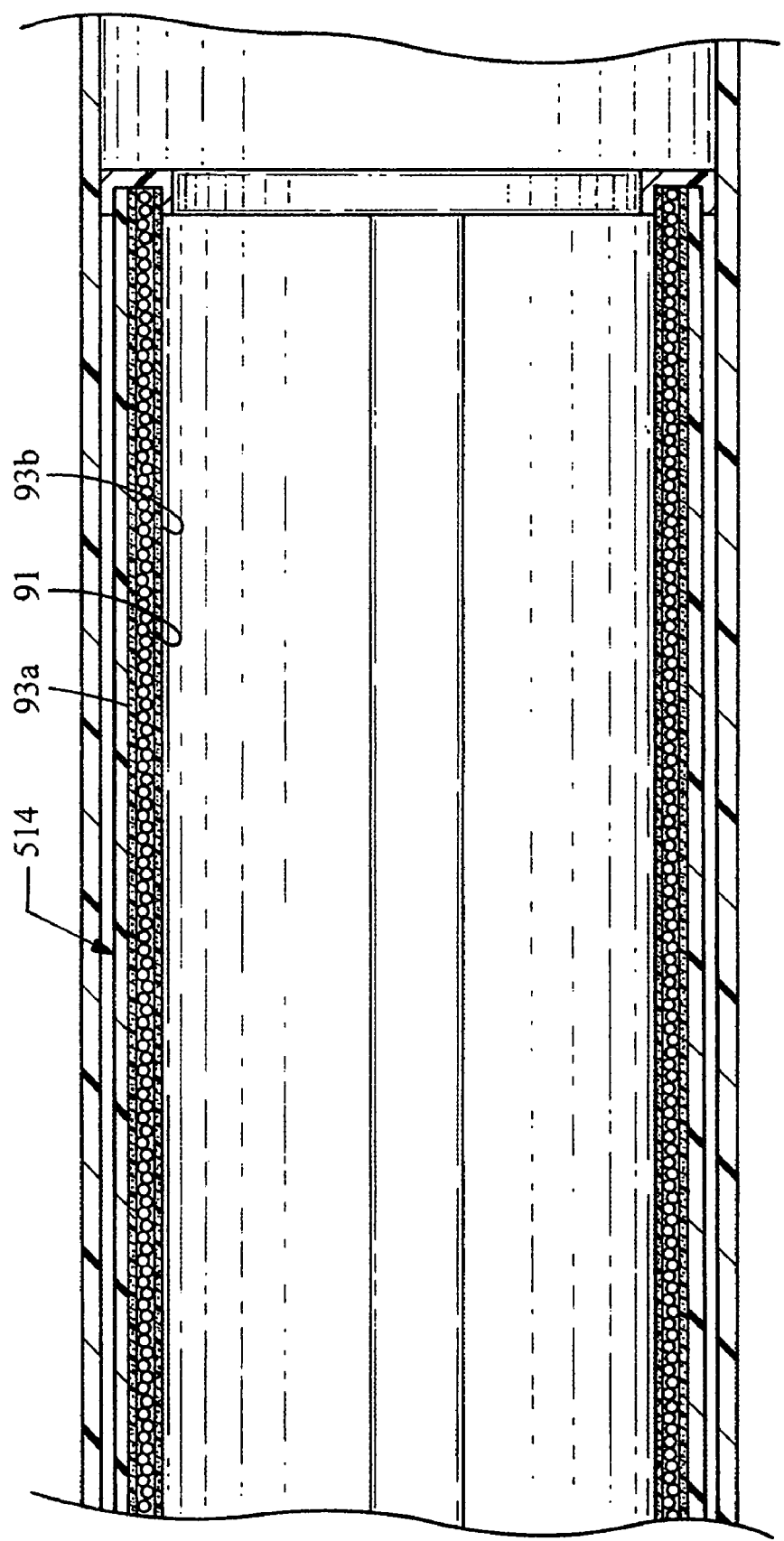
FIG. 10 is a longitudinal sectional view of a portion of an air intake system receiving a hydrocarbon trapping device, embodying the principles of the present invention, and having a plurality of adsorbing pellets located between a pair of semi-permeable membranes.

FIG. 10 shows another alternative embodiment of the present invention is shown, similar to that of FIG. 1, wherein the adsorbing element 514 includes carbon pellets 91 supported between a pair of semi-permeable membranes 93a, 93b.

Alternative embodiments other than those described above may be used with the present invention. It is therefore intended that the foregoing detailed description be regarded as illustrative rather than limiting, and that it be understood that it is the following claims, including all equivalents, that are intended to define the spirit and scope of this invention.

What is claimed is:

1. A hydrocarbon trapping device for an air intake system, the hydrocarbon trapping device comprising:
   a conduit in fluid connection with, and configured to deliver air to, the air intake system, the conduit including a wall having a wall thickness, an inner surface, and a longitudinal axis; and
   an adsorbing element positioned within the conduit and including a hydrocarbon adsorbing material, the adsorbing element having an adsorbing element thickness generally equal to or less than the wall thickness, the adsorbing element having a leading edge a trailing edge and side edges that define a flow path extending between the leading edge and the trailing edge in a direction substantially parallel to the longitudinal axis;
   a retainer extending from the inner surface of the conduit and retainingly engaging the side edges of the adsorbing element;
   wherein the adsorbing element extends substantially completely around an inner perimeter of the conduit adjacent to the inner surface.

2. A hydrocarbon trapping device as in claim 1, wherein the adsorbing element has a generally annular cross-section.

3. A hydrocarbon trapping device as in claim 1, further comprising a protective cap substantially covering a leading edge of the adsorbing element.

4. A hydrocarbon trapping device as in claim 3, further comprising a second protective cap substantially covering a trailing edge of the adsorbing element.

5. A hydrocarbon trapping device as in claim 1, wherein the retainer extends from the inner surface and includes a tab extending in a direction substantially parallel to the conduit inner surface and retaining the arcuate sheet in contact with the conduit inner surface.

6. A hydrocarbon trapping device as in claim 1, wherein the adsorbing element is in contact with the inner surface of the conduit.

7. A hydrocarbon trapping device as in claim 1, wherein the adsorbing element further includes a planar sheet extending across the conduit so as to divide the conduit into two side-by-side flow passageways.

8. A hydrocarbon trapping device as in claim 1, wherein the adsorbing element further includes first and second planar sheets extending across the conduit so as to divide the conduit into three side-by-side flow passageways.

9. A hydrocarbon trapping device as in claim 1, wherein the adsorbing element further includes first, second, and third planar sheets extending across the conduit so as to divide the conduit into four side-by-side flow passageways.

10. A hydrocarbon trapping device as in claim 1, the adsorbing element including a sheet of paper having carbon particles.

11. A hydrocarbon trapping device as in claim 1, the adsorbing element including a foam material having carbon particles.

12. A hydrocarbon trapping device as in claim 1, the adsorbing element including a plurality of pellets having carbon particles and being supported by a semi-permeable membrane.

13. A hydrocarbon trapping device as in claim 1, the adsorbing element having a generally spiral configuration.

14. A hydrocarbon trapping device as in claim 1, wherein the flow path is at least 95% unobstructed by the adsorbing element.

15. A hydrocarbon trapping device as in claim 1, wherein the flow path is at least 95% unobstructed by the adsorbing element.

16. A hydrocarbon trapping device as in claim 1, wherein the flow path extends from a leading edge of the adsorbing element to a trailing edge of the adsorbing element in a direction generally parallel to the longitudinal axis.

17. A hydrocarbon trapping device as in claim 1 wherein the adsorbing element extends substantially completely around an inner perimeter of the conduit adjacent to an inner surface of the conduit.

18. A hydrocarbon trapping device as in claim 17, wherein the adsorbing element includes a planar sheet extending across an opening of the conduit so as to divide the conduit into two side-by-side flow passageways.

19. A hydrocarbon trapping device as in claim 1, wherein the adsorbing element thickness is less than 5 millimeters.

20. A hydrocarbon trapping device as in claim 19, wherein the adsorbing element thickness is generally equal to 1 millimeter.

* * * * *